June 6, 1972   W. H. GRODKIEWICZ ET AL   3,667,921
FLUX GROWTH OF RARE EARTH FLUORIDES
Filed Aug. 7, 1969

INVENTORS W. H. GRODKIEWICZ
L. G. VAN UITERT
BY
ATTORNEY

United States Patent Office 3,667,921
Patented June 6, 1972

---

3,667,921
FLUX GROWTH OF RARE EARTH FLUORIDES
William H. Grodkiewicz, Murray Hill, and Le Grand
G. Van Uitert, Morris Township, Morris County, N.J.,
assignors to Bell Telephone Laboratories, Incorporated,
Murray Hill, N.J.
Filed Aug. 7, 1969, Ser. No. 848,285
Int. Cl. B01j 17/04; C01f 17/00
U.S. Cl. 23—300
7 Claims

ABSTRACT OF THE DISCLOSURE

Rare earth fluorides are grown from a liquid phase which includes a flux ingredient such as beryllium fluoride. Improved effectiveness of the product as an up-converting phosphor is attributable in part to the gettering action of the flux ingredient for oxygen.

---

BACKGROUND OF THE INVENTION

(1) Field of the invention

The invention is concerned with a growth technique for fluoride compounds. Rare earth fluorides grown by such technique are of particular interest as up-converting phosphor layers which result in visible light output when used in conjunction with an infrared emitter.

(2) Description of the prior art

As reflected by the current scientific literature, there has been a considerable amount of interest generated by the announcement of a new class of electroluminescent devices. Such devices, which utilize an infrared source such as a forward biased gallium arsenide junction diode, depend upon an up-converting phosphor to produce visible light. This phosphor, which operates on a second photon or higher order photon mechanism, is sometimes included as a coating on the diode. See Bulletin of the American Physical Society, Series 11, vol. 13, No. 4, p. 687, Paper HK7.

The first device described utilized a coating of lanthanum fluoride containing ytterbium as the sensitizer and erbium as the activator. Further developments have substituted holmium or thulium for erbium and have utilized other host materials including a variety of fluorides, see Materials Research Bulletin, No. 4, p. 381–390, 1969. Such devices, initially of respectable photon efficiency, have been improved during the period following the recent announcement. Improvement has been attributed to a myriad of mechanisms, some relating to the details of the energy transfer processes (lifetimes of various excited states, probability of competing mechanisms, etc.), while others have been concerned with practical considerations (improvement of crystal perfection, minimization of contaminant content).

Fluoride phosphor materials for the described use are ordinarily grown by melt techniques as by Czocralski or Bridgeman growth. Oxygen, recognized as a deleterious contaminant, is kept at a low level by use of a flowing atmosphere of nitrogen or other inert gas.

While other refinements in the growth techniques such as close control of crystallization rates, close temperature control and other refinements have resulted in some improvement, conversion efficiencies thus far realized are not sufficient for many device applications. It is believed that they may be further improved possibly by as much as a factor of two or greater.

SUMMARY OF THE INVENTION

In accordance with the invention, fluoride compounds, including those of the rare earths and also of ytterbium and the transition metals, are grown by a flux technique from a molten phase containing a solvent of a fluoride having an affinity for oxygen which exceeds that of the cation/s of the growing material. Exemplary flux ingredients falling in this category include $BeF_2$, $MgF_2$, and $AlF_3$.

The oxygen affinity of the flux ingredient is economically significant in that it may simplify required pretreatment of raw materials.

When used as an up-converting phosphor, materials of the invention show improved efficiencies as compared with similar materials grown from the melt. Such improvement is attributed, in part, to improved crystal perfection; primarily to a lessened number of defects. Suitability for this purpose is, of course, assured by the low oxygen concentration attributable to the gettering action of the flux ingredient.

While many of the flux ingredients utilizable, in accordance with the invention, do not enter the growing material in any appreciable quantity (notable examples are $BeF_2$ and $MgF_2$), others may enter, to some extent, so producing a somewhat different but still useful composition (an example of a flux ingredient in this category is $AlF_3$).

DETAILED DESCRIPTION

(1) Drawing

Figure 1:
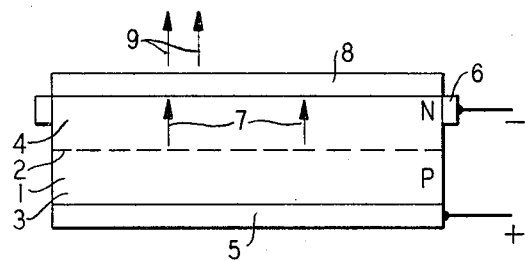
FIG. 1 is a front elevational view of an infrared emitting diode provided with a phosphor converting portion in accordance with the invention.

Referring again to FIG. 1, gallium arsenide diode 1 containing p-n- junction 2, defined by p and n regions 3 and 4, respectively, is forward biased by planar anode 5 and ring cathode 6 connected to power supply not shown. Infrared radiation is produced by junction 2 under forward-bias conditions; and some of this radiation, represented by arrows 7, passes into and through layer 8 of a phosphorescent material in accordance with the invention. Under these conditions, some part of radiation 7 is absorbed within layer 8, and a major portion of that absorbed participates in a two-photon or higher order photon process to produce radiation at a visible wavelength/s. The portion of this radiation which escapes is represented by arrows 9.

Figure 2:
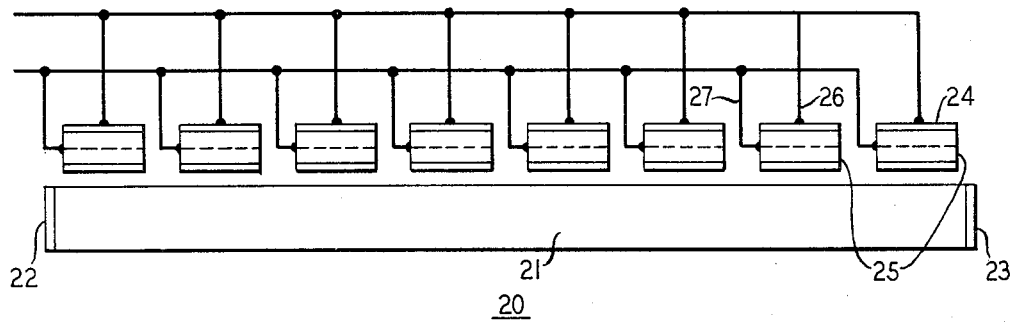
FIG. 2 is a front elevational view of an infrared diode-pumped laser, the latter consructed of a composition grown in accordance with a process herein.

The device of FIG. 2 is an optically pumped, solid state laser 20 comprising single crystal rod 21 composed of the composition herein, said rod 21 being provided with reflecting layers 22 and 23. When laser 20 is intended to operate as an oscillator, one of the two layers, such as 22, may be completely reflecting while the other, e.g. layer 23, may be partially reflecting. As in usual optically pumped solid state laser construction, layers 22 and 23 may be composed of a series of dielectric layers.

Rod 21 is optically pumped by light source 24. In the specific example shown considered to represent the preferred embodiment of the laser configuration, this light source is made up of one or more infrared-emitting diodes 25. Each of these diodes may resemble that shown in detail in FIG. 1 and each is accordingly provided with electrode connections 26 and 27 connected to source, not shown, for forward biasing to the emitting condition. The particular arrangement of FIG. 2 is merely exemplary. An optimized structure may, for example, utilize an enveloping tube. In cross section, the junction may define one of a series of circles concentrically disposed about the rod 21 and within the tubular structure. Other configurations may utilize end pumping, reflectors, etc.

(2) Postulated excitation mechanism

Concerning use of the inventive materials as conversion layers, a detailed description of this mechanism is not considered a necessary part of the disclosure. A detailed description may be found in Materials Research Bulletin, No. 4, pp. 381–390 (1969). Briefly, operation is dependent upon absorption by $Yb^{3+}$ of infrared emission. A quantum of energy is transferred to the activator ion which is so raised to an excited state of sufficient lifetime that it may be further excited by absorption of a second quantum to a higher elevated state. In the simple second photon process, emission of visible light proceeds from such level usually accompanied by emission of one or more phonons.

(3) The process

Starting ingredients primarily responsible for growth of the end product may be the same as we are used in a melt process. In the example of yttrium ytterbium erbium fluoride, starting ingredients may consist of yttrium oxide $Y_2O_3$, ytterbium oxide $Yb_2O_3$, erbium oxide $Er_2O_3$ and aqueous hydrogen fluoride HF. An exemplary flux ingredient is beryllium fluoride $BeF_2$.

The preparatory technique is generally described:

The starting oxides are dissolved in a suitable solvent such as aqueous $HNO_3$. This procedure may be carried out at room temperature. A hydrous fluoride is precipitated by the addition of HF. The precipitate is dried, following which the dried precipitate together with the flux is placed in a crucible.

Crucible and contents are next placed in a furnace in an inert atmosphere and the contents are melted.

Crystallization results on cooling.

The amounts of starting ingredients are essentially those desired in the crystallizing material. As in usual flux growth, however, distribution coefficients for the various ions are not all the same. In this instance, they favor the initial concentration of rare earth constituents. For certain purposes, it may be desired to compensate for this effect by initial adjustment of such ingredient and/or by addition during crystallization. The amount of nitric acid or other solvent used for initial dissolving is noncritical. It has been expedient to use 50% by volume aqueous acid solvent. The minimum amount of acid is that sufficient to bring about total solution.

Precipitation with hydrogen fluoride is, again, noncritical. In some of the experimental work, concentrated aqueous HF was poured in while stirring. Precipitation may be observed visibly.

The precipitate may next be separated from the solvent by filtering; and the precipitate is then dried, for example, at room temperature for periods of the order of several days. Drying may be accelerated by increased temperature up to about 100° C. This step may be carried out in air. Exceeding a temperature of 100° C. may result in some loss of fluorine.

The relative amounts of flux and ingredients, again, is to be set in accordance with conventional practice. As will be seen from the specific examples, expedient results are obtained for certain of the flux materials with relatively high solute/solvent ratios. Preferred ratios depend on the specific systems and growth conditions. For many purposes, the grown materials, in accordance with the invention, are utilized only as very small crystals or powders. In other instances, large crystal sections may be desired. In the former, rapid cooling, for example, at the rate of 100° C. per hour or higher, may be desired. In the latter, slow cooling at the rate of 1° per hour or slower may be required.

The above outline is extremely general. The invention is suitably applied to the growth of a variety of compositions in a variety of forms using a variety of fluxes. Specific growth conditions are to be selected in accordance with such parameters and also in accordance with the desired form of the final product. Basis upon which such choices may be made are well known to practitioners in the field.

The invention depends in large part on the flux growth of the described class of materials from any of a described class of fluxes. Improved results, particularly where the materials are used as phosphors, are predicated on improved crystals perfection and low oxygen content.

(4) Composition (a) End product: Desired end products produced in accordance with the inventive processes invariably contain fluorine although other anions such as chlorine, bromine and iodine may also be included, generally in amounts of up to 80 atom percent based on total halogen. Still further substitution may not interfere with growth but does not generally result in end product compositions benefitting by the process for most device uses. The preferred class of cations are the rare earths; and where grown materials are to be utilized as phosphors, such rare earths include ytterbium together with at least one of the ions of erbium, thulium and holmium. The inventive processes are peculiarly beneficial as applied to the growth of such preferred compositions since these ions have a marked affinity for oxygen.

Still considering ultimate use as a phosphor, preferred compositions may additionally include ions such as yttrium, barium, strontium, gadolinium, lutetium, lanthanum, sodium, lithium, etc. which may serve largely as diluents so permitting concentration control of the rare earth ions necessary for fluorescence dependent on anion content.

Other compositions desirably grown may substitute or include aditional rare earths, other diluent materials, and a variety of other cations.

Classes of materials of primary interest at this time for phosphor use may be described in terms of the following atomic ratios.

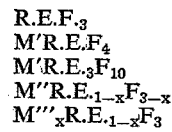

in which

M' is lithium or sodium,
M" is calcium, strontium or barium,
M'" is scandium, aluminum, gallium or indium, and
$x$ ranges from 0.0 to 0.95.

The lower limit includes $R.E.F_3$ and the higher limit is based on the necessary inclusion of R.E.-ions of at least 5% for phosphor use. R.E. is yttrium or any of the other rare earths of the lanthanide or actinide series. These include at least 5% Yb and 0.02% of Tm, Er and/or Ho. Any of these compositions may contain partial substitutions of any of the other halides for fluorine as indicated above.

Growable compositions may be adapted to other than phosphor use; and for these purposes, while the general stoichiometries as set forth above are applicable, rare earth ions may be replaced in part or in whole by the transition ions vanadium, chromium, manganese, iron, cobalt, nickel and copper. For such uses, the M' ion may additionally be selected from potassium, rubidium, cesium and thulium.

It has already been noted that under certain circumstances material primarily intended as a flux ingredient may also enter the final composition. This effect has been noted for an aluminum fluoride flux. Accordingly, the compositions described above may be so modified.

(b) Flux ingredients: While improved characteristics of grown materials in accordance with the invention are premised, in large part, on improved crystal perfection, it is, as has been noted desirable to maintain the oxygen contamination level at a minimum. While this may be achieved by taking the usual precautions which precede melt growth (long term roasting in HF of hydrous precipitates, etc.), it is an advantage of the inventive process that such procedure may be avoided by use of a flux ingredient having a high oxygen affinity. The preferred class of flux compositions is defined with this objective in mind. Examples set forth herein utilize one of the ingredients $BeF_2$, $MgF_2$ or $AlF_3$ and preferred flux compositions, in accordance with the invention, are defined as containing some amount, at least 1% by weight based on total flux, of at least one of these compounds. Lesser amounts are insufficient for supplying the necessary $O_2$ getter action. Alternative materials include fluorides of boron, silicon, phosphorus. Since such materials are quite volatile, growth at atmospheric pressure requires some compositional modification to reduce such volatility by inclusion of other cations. Additional flux components may include $PbF_2$, $BiF_3$, $SnF_2LiF$, $NaF$, $KF$, $RbF$, $CsF$, $TlF$ and $ScF_3$.

It is considered desirable to include ammonium fluoride, $NH_4F$ as an initial flux ingredient. This material volatilizes at a low temperature thereby flushing the atmosphere. Inclusion of up to about 90% by weight based on total flux is considered a preferred maximum for attaining this end.

(5) Examples (I) The composition $Y_{0.8}Yb_{0.19}Er_{0.01}F_3$ was grown by use of the indicated amounts and types of starting ingredients: 4.5 grams $Y_2O_3$, 1.9 grams $Yb_2O_3$ and 0.1 gram $Er_2O_3$. These ingredients were dissolved in an excess of aqueous $HNO_3$ ($\sim$50 ml. was used). Precipitation was brought about by introduction of an excess of HF ($\sim$15 ml. of concentrated HF). The precipitate was filtered and dried at room temperature in air for a period of three (3) days. The dried precipitate was placed in a platinum crucible with 1.5 grams of $BeF_2$ and 3 grams of $NH_4F$. Crucible and contents were placed in a furnace at a temperature of 1100° C. and were maintained in a nitrogen atmosphere while cooling to room temperature at a rate of 50° per hour. The final material had an average crystal particle size of about $\frac{1}{10}$ mm.

The precipitate was utilized as a phosphor layer on a gallium arsenide diode. Under usual operating conditions, the green light output was about 1% of the infrared light incident on the phosphor.

(II) The procedure of Example I was carried out in the growth of $Y_{0.65}Yb_{0.35}Tm_{0.001}F_3$ utilizing the following ingredients:

3.7 grams $Y_2O_3$
3.5 grams $Yb_2O_3$
0.01 gram $Tm_2O_2$

Other conditions were as recited in Example I. Final phosphor efficiency was about 0.025%.

(III) A single crystal of the composition $Y_{0.8}Yb_{0.19}Er_{0.01}F_3$ was grown from the following initial ingredients:

22.5 grams $Y_2O_3$
9.5 grams $Yb_2O_3$
0.5 gram $Er_2O_3$

Dissolution, precipitation and drying were carried out as in Example I. Flux growth was from a solution containing 15 grams $BeF_2$
75 grams $PbF_2$
25 grams $NH_4F$ The procedure of Example I was carried out except that cooling was at a rate of about 3° per hour to 800° C. Subsequent cooling to room temperature was brought about simply by turning off the furnace and required a period of about 2 days. Crystals up to 8 mm. to a side were obtained.

A variety of other materials were grown using illustrative members of the flux classes set forth.

(6) Purity

Tolerable impurity content depends upon the purpose to which the products are to be put. For phosphor use, it is particularly desirable to maintain high purity; and for such purpose, the total impurity content of certain contaminants should not exceed 10 p.p.m. Such contaminants known to impair fluorescent properties are terbium, europium, samarium, dysprosium and iron. In the instance of phosphors dependent upon holmium or erbium as an activator, thulium also has a quenching effect and should be included in the foregoing list.

Other impurities are critical only insofar as they affect crystal perfection; and to this end, a maximum content of such impurities of 1% by weight may be tolerated.

We claim:

1. Process for crystallizing an up-converting phosphorescent fluoride compound selected from the group consisting of $R.E.F_3$, $M'R.E.F_4$, $M'R.E._3F_{10}$, $M''_xR.E._{1-x}F_{3-x}$ $M'''_xR.E._{1-x}F_3$ in which M' is lithium or sodium, M'' is calcium, strontium or barium, M''' is scandium, aluminum, gallium or indium, R.E. is yttrium or any of the rare earths of the lanthanide series or the actinide series, $x$ may vary from 0.00 to 0.95, and in which the said fluoride compound contains both at least 5 atom percent ytterbium and at least 0.02 atom percent of at least one ion selected from the group consisting of erbium, thulium and holmium where such percentages are based on total R.E. content by flux growth characterized in that said flux contains at least 1 weight percent of a fluoride containing at least one element selected from the group consisting of beryllium, magnesium, aluminum, boron, silicon and phosphorus.

2. Process of claim 1 in which said flux additionally initially contains at least 1% by weight of $NH_4F$.

3. Process of claim 1 in which said flux additionally contains a compound selected from the group consisting of $PbF_2$, $BiF_3$, LiF and NaF.

4. Process of claim 3 in which said flux initially contains at least 1% by weight of $NH_4F$.

5. Process of claim 1 in which said flux contains at least 1% by weight of $BeF_2$.

6. Process of claim 1 in which said flux contains at least 1% by weight of $MgF_2$.

7. Process of claim 1 in which said flux contains at least 1% by weight of $AlF_3$.

References Cited

UNITED STATES PATENTS

| | | | |
|---|---|---|---|
| 2,721,950 | 10/1955 | Piper et al. | 23—305 |
| 2,737,442 | 3/1956 | Cunningham et al. | 23—88 |
| 3,009,774 | 11/1961 | Linz | 23—88 |
| 3,031,261 | 4/1962 | Vogel et al. | 23—88 |
| 3,203,899 | 8/1965 | Fisher | 23—88 |
| 3,282,641 | 11/1966 | Sfiligoj et al. | 23—300 |
| 3,379,648 | 4/1968 | McDuffie | 23—88 |
| 3,503,812 | 3/1970 | Prener | 313—108 |
| 3,397,316 | 8/1968 | Brown et al. | 252—301.4 |
| 3,506,584 | 4/1970 | Kalman et al. | 252—301.4 |
| 3,533,956 | 10/1970 | Snitzer | 252—301.4 |
| 3,541,018 | 11/1970 | Hewes et al. | 252—301.4 |
| 3,580,860 | 5/1971 | Sarver et al. | 252—301.4 |

NORMAN YUDKOFF, Primary Examiner

R. T. FOSTER, Assistant Examiner

U.S. Cl. X.R.

252—301.4 R; 23—305, 20